F. L. GUILLEMET.
ASPHALT PAVEMENT CUTTING MACHINE.
APPLICATION FILED OCT. 28, 1919.
1,366,649.
Patented Jan. 25, 1921.
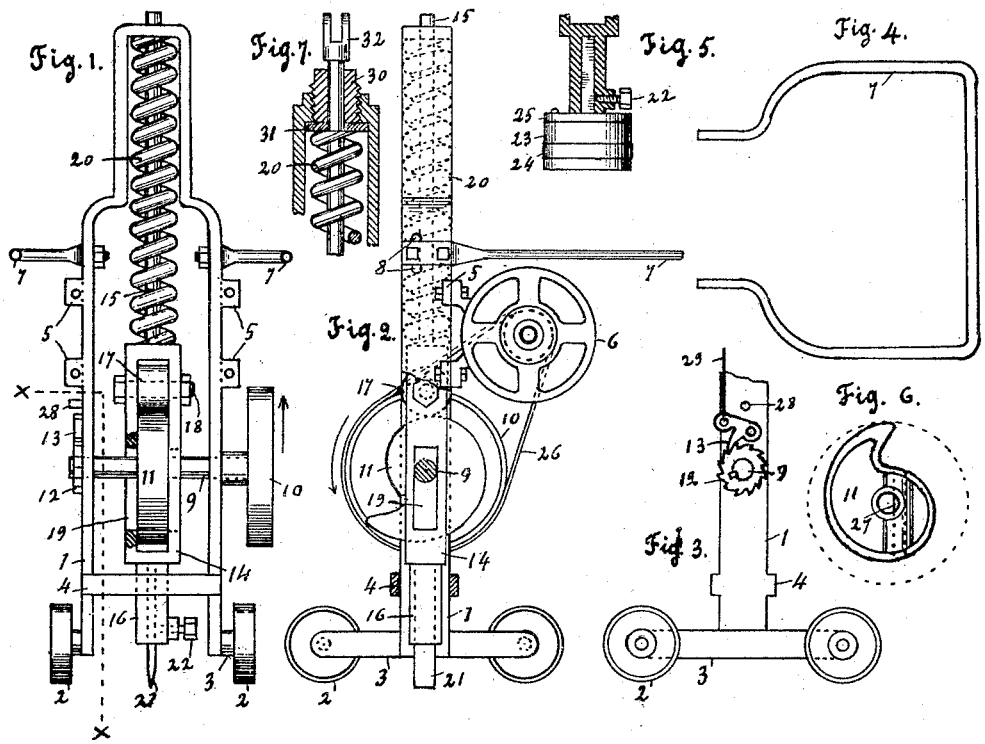

UNITED STATES PATENT OFFICE.

FRANÇOIS LEONIDAS GUILLEMET, OF SAN FRANCISCO, CALIFORNIA.

ASPHALT-PAVEMENT-CUTTING MACHINE.

1,366,649. Specification of Letters Patent. Patented Jan. 25, 1921.

Application filed October 28, 1919. Serial No. 334,018.

*To all whom it may concern:*

Be it known that I, FRANÇOIS LEONIDAS GUILLEMET, a citizen of the United States, residing at San Francisco, in the county of San Francisco and State of California, have invented a new and useful Asphalt-Pavement-Cutting Machine, of which the following is a specification and the accompanying drawings a part thereof.

The main specific purpose of this invention is to provide a simple, small, light, portable, yet powerful machine adapted to be operated and wheeled around by one man, for cutting circular or circuitous patches of asphalt pavement in parts where repairs are required as well as for long stretches of work, such as is to be done for laying pipes or conduits, etc., under street pavements. In the latter case, the foundation of stone and cement, or concrete under the asphalt covering would have to be cut through also. This can be effected by means of two machines following each other, one cutting the asphalt first and the other cutting or breaking the foundation by hammering with any suitable shape of blunt tool, somewhat longer than for cutting the asphalt. Or one machine can be made powerful enough to cut through both the covering of asphalt and its base. Such a machine may be moved along by any small powered vehicle if too heavy for one man to handle. The machine is adaptable to many other uses however and some of these will be mentioned hereinafter.

In the drawings, Figure 1 is a front view of the machine with its motor removed; Fig. 2 is a side view of the same machine with its motor attached thereon and a part of the machine broken away on line X X of Fig. 1; Fig. 3 is a side view of the part broken away in Fig. 2; Figs. 4, 5, 6, 7 are views of details or modifications described hereinafter.

1 is the exterior housing of the machine on which two pairs of supporting wheels 2 are mounted; this part is formed from a flat bar of iron or steel bent as shown; on the lower end of this bar are welded or riveted the cross bars 3 on which the base wheels 2 are mounted; the bar 1 is also reinforced by the cross bars 4, welded or riveted on its two legs near the bottom: the ears 5 are also formed on the bar 1 and are for fastening the electric or other motor 6 thereon; the handles 7, for pushing or pulling the machine, are also fastened on bar 1 by means of two bolts on each side; one of these bolts on each side may be removed for folding the handles down or up; the bolts to be removed may be inserted into any one of several holes 8, for raising or lowering the other end of the handles as most convenient for the operator; the two handles may be separate or they may be joined at the outer end as shown in Fig. 4.

Toward the middle part of the housing 1 is journaled a shaft 9, bearing the operating wheel 10, the cam 11 and the ratchet 12, all keyed fast on the shaft 9 and turning with it; a pawl 13 controls ratchet 12. An elongated rectangular link 14, formed from another flat bar of iron with the ends welded together, is provided at one end with a guide rod 15 and at the other end with a socket extension 16; all of these parts, 14, 15, 16 form a single solid piece which I call the hammer and will be also referred to as part 14. This part carries a roller 17, arranged to turn freely on the spindle 18, traversing part 14. Two slots 19 are formed on the sides of part 14, permitting the hammer to move up and down without interference from the shaft 9, which crosses through said slots and acts as a second guide for the hammer. A stiff spring 20, offers a strong resistance to the upward motion of the hammer. When the cam 11 is turned through the wheel 10 and the motor however, the cam operates on the roller 17 and the spring is gradually compressed upward by lifting of the hammer until the nose of the cam gets under the roller, when the spring will snap back throwing the hammer down with great force, this being repeated at every turn of the wheel 10. The tool 21 has a shank fitting in the socket of extension 16 and the tool is held in place by a set screw 22. The extension is made rather long, so that as the tool is shortened by wear it may be extended outward by placing some washers or other pieces of metal at the bottom of the socket for backing the tool shank. It will be clear also that by lifting the machine more or less through the handles, so as to make it bear on two wheels only, the tool can be made to work at different levels, so as to compensate for inequalities of level in the ground. If the tool is to work regularly below the level of the ground or beyond the bearing wheels of the machine, then a tool having a shank of appropriate length should be employed and the machine can be positioned so as to make the tool work up or down or at any angle.

In Figs. 1 and 2 a bladed or wedge shaped tool is shown as adapted for cutting asphalt or other hard pavement, but many other kinds of tools may be applied and used with the machine. In Fig. 5 is shown a tool adapted for tamping down freshly laid paving blocks of either stone, wood or brick, etc. The tool consists of a block of wood 23, bound by a hoop 24 and attached to a disk of iron 25, the latter being provided with a shank for insertion in the tool socket.

The pinion on the motor is shown as transmitting power to wheel 10 by means of a belt 26 for convenience of illustration, but in practice a set of sprocket wheels and chain or a set of spur wheels would be preferable. Fig. 6 is a view of the cam 11 detached and shows one way of keying it to its shaft, which is by means of a pin 27, shown in dotted lines. Before boring the hole for the pin, the cam is inserted in place on the shaft and the boring tool is directed to cut a notch on the side of the shaft; this notch is filled by the pin when inserted and the cam is thereby keyed both crosswise and lengthwise without weakening the shaft so much as by crossing it with a pin in the center. The pin may be slightly shorter than its hole. The dotted circle in Fig. 6 shows by comparison how the ascending slope of the cam periphery should be gradual and uniform from minimum to maximum radius for smoothness of running and efficiency in operation.

The purpose of the ratchet 12 with its pawl 13 is for locking the hammer in an elevated position when the machine is not working, so that it may be wheeled about without dragging the tool 21 on the ground. For that purpose the power is cut off at the moment the cam holds the hammer near its highest point and the pawl 13 prevents the cam turning backward. The pawl acts by its own weight and needs no spring, but a lug 28 prevents it being thrown over the other side. Control of said pawl may be brought to the hand of the operator, such as by means of a cord or wire 29, which however is not essential, as the pawl will not interfere with the working of the machine when left loose. Control of the motor may also be brought to the other hand of the operator by any appropriate switching contrivance. If desired, means may also be provided for tensioning the spring 20 more or less within the capacity of the motor, such as shown in Fig. 7, in which the stem 15 passes through a perforated plug 30, which is adapted to compress the spring when screwed down against the disk or washer 31. The hammer could be provided with a tool at either end, and a yoke 32 is shown on the end of rod 15 in Fig. 7 adapted to be connected with some tool in which a pulling movement would be required to operate it. Furthermore, any inverted construction or changing the relative position of parts is within the scope of my invention.

This machine is adapted to operate any kind of tools for hammering, pounding, crushing, cutting, chopping, shearing or sawing any kind of material according to its nature, so long as the right kind of tool and setting of proper adjunct appliances is provided in each case in which a continuous or more or less prolonged operation is required, although the machine itself has to be built in various degrees of strength for various special purposes. Among the uses it may be applied to are the following: rock drilling, stone crushing, demolishing old masonry, chopping or crushing animal food, pile driving by attaching the machine on top of pile, cutting metal with shears or cold chisel, and a great variety of other operations adapted to be performed by means of a machine.

What I claim as my invention and desire to secure by Letters Patent is:

1. In a machine of the character described, the combination of a frame, a movable member mounted in the frame, means for intermittently and forcefully moving said member in one direction, and operating means including a uniformly graduated cam of spiral contour engaging said member, whereby the operating means is adapted with a minimum expenditure of power, to advance the member in the opposite direction at a uniform rate of speed.

2. In a machine of the character described, the combination of a frame, a reciprocating member mounted in the frame and adapted to carry a tool, means for gradually and uniformly advancing said reciprocating member in one direction and quickly releasing said member at the end of the said advance movement, and means operable upon said reciprocating member when relieved for forcefully returning the same to its initial position.

3. In a portable pavement cutting machine, a frame, a reciprocating member carried vertically intermediate ends of the frame adapted to support a downwardly projecting tool, means carried by the frame for operating the reciprocating member to effect impact of the tool on the surface beneath the frame, pairs of wheels mounted on the frame at opposite sides of the reciprocating member, and manual means on the frame to move the same and guide the operation of the tool.

FRANÇOIS LEONIDAS GUILLEMET.

Witnesses:
W. LYFORD,
LAURENCE BURTON.